US009026483B1

(12) United States Patent
Cohen

(10) Patent No.: US 9,026,483 B1
(45) Date of Patent: May 5, 2015

(54) AUTOMATIC PREDICTION OF ASPECTS OF HUMAN TASK PERFORMANCE

(75) Inventor: Peter D. Cohen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2213 days.

(21) Appl. No.: 11/942,411

(22) Filed: Nov. 19, 2007

(51) Int. Cl.
G06Q 10/06 (2012.01)
G06N 5/02 (2006.01)

(52) U.S. Cl.
CPC ............ *G06Q 10/06375* (2013.01); *G06N 5/02* (2013.01)

(58) Field of Classification Search
None
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 | 4/2001 | Lauffer | 705/8 |
| 6,393,497 B1 | 5/2002 | Arnold et al. | 709/330 |
| 6,519,763 B1 * | 2/2003 | Kaufer et al. | 717/101 |
| 6,539,377 B1 | 3/2003 | Culliss | 707/5 |
| 6,546,087 B2 | 4/2003 | Shaffer et al. | 379/90.01 |
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |

(Continued)

OTHER PUBLICATIONS

"About Spending," retrieved Nov. 23, 2004, from http://www.mypoints.com/mp/dstatial.show?isref=nmhp.popup.aboutspending.default, 1 page.

(Continued)

*Primary Examiner* — Stanley K Hill
(74) *Attorney, Agent, or Firm* — Seed IP Law Group PLLC

(57) ABSTRACT

Techniques are described for automatically facilitating the performance of tasks based on automatically generating predictions about future task performance, and then using the generated task performance prediction information in various ways. For example, as tasks are performed via a task exchange server system, various information about the tasks and their performance may be tracked, and the tracked information may then be analyzed to identify relationships between various of the information related to the tasks and to corresponding information about the performance of the tasks. Based on the identified relationship information, the task exchange server may automatically generate predictions regarding how performance of additional tasks will occur in the future, such as by determining task performance information that corresponds to information available about the additional tasks. The automatically generated task performance prediction information may then be used to facilitate performance of tasks in various manners.

24 Claims, 5 Drawing Sheets

(56) References Cited

U.S. PATENT DOCUMENTS

| | | | |
|---|---|---|---|
| 6,704,403 B2 | 3/2004 | Lurie et al. | 379/114.1 |
| 6,707,904 B1 | 3/2004 | Judkins et al. | 379/265.06 |
| 6,763,104 B1 | 7/2004 | Judkins et al. | 379/265 |
| 6,859,523 B1 | 2/2005 | Jilk et al. | 379/32.01 |
| 6,938,048 B1 | 8/2005 | Jilk et al. | 707/102 |
| 7,155,400 B1 | 12/2006 | Jilk et al. | 705/9 |
| 7,197,459 B1 | 3/2007 | Harinarayan et al. | 704/270.1 |
| 7,774,742 B2* | 8/2010 | Gupta et al. | 717/101 |
| 2002/0069079 A1 | 6/2002 | Vega | 705/1 |
| 2002/0083079 A1 | 6/2002 | Meier et al. | 707/104.1 |
| 2002/0174093 A1* | 11/2002 | Casati et al. | 707/1 |
| 2003/0078852 A1 | 4/2003 | Shoen et al. | 705/26 |
| 2003/0200156 A1 | 10/2003 | Roseman et al. | 705/27 |
| 2003/0204449 A1 | 10/2003 | Kotas et al. | 705/27 |
| 2004/0111306 A1* | 6/2004 | Yokota et al. | 705/7 |
| 2006/0070020 A1* | 3/2006 | Puttaswamy et al. | 717/101 |
| 2006/0106675 A1* | 5/2006 | Cohen et al. | 705/26 |
| 2006/0106774 A1 | 5/2006 | Cohen et al. | 707/3 |
| 2007/0005414 A1* | 1/2007 | Connors et al. | 705/9 |
| 2007/0124186 A1* | 5/2007 | Virine | 705/8 |

OTHER PUBLICATIONS

"Earning Points with MyPoints," retrieved Nov. 23, 2004, from http://www.mypoints.com/mp/dstatial.show?isref=nmhp.popup.aboutearning.default, 1 page.

"FAQs," retrieved Nov. 23, 2004, from http://www.mypoints.com/mp/dstatial.show?isref=nmhp.popup.faq.default, 1 page.

"Frequently Asked Questions about the Open Mind Initiative," retrieved Nov. 16, 2004, from http://www.openmind.org/FAQs.html, pp. 1-3.

"Frequently Asked Questions," TrueDater FAQ's, retrieved Apr. 4, 2005, from http://www.truedater.com/index.php?action=faqs, pp. 1-2.

"Grid—The Competitive Advantage," Aug. 2004, retrieved Jun. 9, 2005, from http://www.sun.com/solutions/documents/articles/grid_adv_aa.xml?null, pp. 1-2.

"Join MyPoints Now," retrieved Nov. 23, 2004, from http://www.mypoints.com/?MCK=ccb67d8c41a3819b, pp. 1-4.

"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/ff1c8, pp. 1-3.

"The ESP Game," retrieved Jun. 8, 2005, from http://www.espgame.org, 1 page.

"What is BonusMail®?," retrieved Nov. 23, 2004, from http://www.mypoints.com/mp/dstatial.show?isref=nmhp.popup.bonusmail.default, 1 page.

"What is Keen," retrieved Jun. 8, 2005, from http://www.keen.com/documents/homepage/wik_pop.asp?TID=gbFQnFLPstnUuFonMtBmHw, 1 page.

"What is MyPoints," retrieved Nov. 23, 2004, from http://www.mypoints.com/mp/dstatial.show?isref=nmhp.popup.whatis.default, 1 page.

About, Inc., "Intelligent Agents," retrieved Jun. 9, 2005, from http://psychology.about.com./od/intelligentagents/, pp. 1-5.

About, Inc., "Our Story," retrieved Jun. 9, 2005, from http://ourstory.about.com/, pp. 1-2.

About, Inc., Welcome to About.com, retrieved Jun. 9, 2005, from http://www.about.com, pp. 1-2.

Applied Skills & Knowledge, LLC, "Make Skills-Based Routing Happen," Jun. 3, 2003, retrieved from http://www.appliedskills.com/whitepapers/files/Skills-basedRouting.pdf, 3 pages.

Barlas, D., "Hipbone Connects to Kana," Jan. 5, 2004, retrieved Jun. 8, 2005, from http://www.line56.com/print/default.asp?ArticleID=5255, 1 page.

Calishain, T., "Yahoo! Service Offers More Advice than Expertise," May 6, 2002, retrieved Jul. 16, 2004, from http://www.infotoday.com/newsbreaks/nb020506-1.htm, pp. 1-2.

distributed.net, "distributed.net History & Timeline," retrieved Jun. 8, 2005, from http://www.distributed.net/history.php, pp. 1-7.

distributed.net, "The Organization," retrieved Jun. 8, 2005, from http://www.distributed.net/, pp. 1-2.

Doan, A., "MongoMusic Fans Include Microsoft," Sep. 9, 2000, retrieved Jun. 9, 2005, from http://www.forbes.com/2000/09/09/feat2.html, pp. 1-3.

Dubaud, S., "Advice Site Resort to Legal Counsel," Jan. 4, 2002, retrieved Apr. 29, 2004, from http://news.com.com/2011-1088-801359.html, pp. 1-3.

Elance Inc., Elance Online™—Everyday Outsourcing™, retrieved Jun. 9, 2005, from http://www.elance.com/c/static/main/displayhtml.pl?file=eol.html&module=home, pp. 1-2.

Elance, Inc., "Elance History," retrieved Jun. 8, 2005, from http://www.elance.com/c/static/main/displayhtml.pl?file=heritage.html, pp. 1-3.

eLancer homepage, retrieved Jun. 8, 2005, from http://www.elancer.us/, pp. 1-2.

Epinions, Inc., Epinions.com homepage, retrieved Jun. 9, 2005, from http://www.epinions.com, pp. 1-2.

Fox, S., "Can New Technology Revolutionize the Net?," Jun. 1, 2000, retrieved Jun. 8, 2005, from http://web.archive.org/web/20001018221958/www.cnet.com/insider/0-121949-7-1995365.html, pp. 1-3.

Get a Freelancer.com homepage, Innovate it, retrieved Jun. 9, 2005, from http://www.getafreelancer.com, pp. 1-3.

gonesilent.com homepage, Aug. 22, 2000, retrieved Jun. 8, 2005, from http://web.archive.org/web/20000822122731/www.gonesilent.com/about.html, pp. 1-2.

Google, "Ask a question, Set your Price. Get your Answer.," retrieved Jun. 9, 2005, from http://answers.google.com/answers/, 1 page.

Google, "Your Computer's Idle Time is too Precious to Waste," retrieved Jun. 9, 2005, from http://toolbar.google.com/dc/offerdc.html, 1 page.

Gunn, S., "Hey, buddy, can you spare some cycles?," Sep. 24, 1997, retrieved Jun. 8, 2005, from http://www.cnn.com/TECH/9709/24/netly.news/, pp. 1-4.

Hagel, J. et al., "Go Slowly with Web Services," Feb. 15, 2002, retrieved from http://www.cio.com/archive/021502/keynote.html, 4 pages.

Hagel, J., et al., "Your Next IT Strategy," *Harvard Business Review* RO109G:105-113, Oct. 2001.

Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.

Ingenio, Inc., Ingenio™ homepage, retrieved Jun. 8, 2005, from http://www.ingenio.com/default.asp?TF=1, pp. 1-2.

Ingenio, Inc., Introducing Ingenio™ Pay Per Call™, retrieved Jun. 8, 2005, from http://www.ingenio.com/documents/corp/home.asp, pp. 1-2.

Ingenio, Inc., Keen—Your Personal Advisor, retrieved Jun. 8, 2005, from http://www.keen.com, pp. 1-2.

Ingenio, Inc., Keen—Your Personal Advisor/Get Advice, retrieved Jun. 8, 2005, from http://www.keen.com/categories/get_answers.asp?SRCHT=0&search=&gid=0, 1 page.

Jupitermedia Corporation, "About jGuru.com: Overview," retrieved Jun. 9, 2005, from http://wwwjguru.com/misc/about-overview.jsp, pp. 1-2.

Jupitermedia Corportion, jGuru homepage, retrieved Jun. 9, 2005, from http://www.jguru.com, pp. 1-5.

Kana Inc., "Corporate Overview," retrieved Jun. 8, 2005, from http://www.kana.com/about/about.aspx, pp. 1-2.

Katz, J., et al., "The Benefits of a Virtual Contact Center," MCI, Inc., May 2004, retrieved from http://global.mci.com/us/enterprise/insight/whitepapers/pdf/VirtualContactCtr.pdf, 7 pages.

Kenexa, "Call Centers," retrieved Jun. 8, 2005, from http://www.kenexa.com/ind_callcent.html, pp. 1-3.

Lynn, R., "Keeping Online Daters Honest," Apr. 1, 2005, retrieved on Apr. 4, 2005, from http://www.wired.com/news/print/0,1294,67083,00.html, pp. 1-3.

(56) References Cited

OTHER PUBLICATIONS

Massive Multiplayer Online Role-Playing Game—homepage, retrieved Jun. 8, 2005, from http://www.mpog.com, pp. 1-2.
Microsoft Corporation, "Microsoft Acquires MongoMusic," Sep. 13, 2000, retrieved Jun. 9, 2005, from http://www.microsoft.com/presspass/press/2000/sept00/mongopr.mspx, pp. 1-2.
Mori, G., et al., "Breaking a Visual CAPTCHA," retrieved Jun. 8, 2005, from http://www.cs.berkeley.edu/~mori/gimpy/gimpy.html, pp. 1-4.
Mossberg, W., "GuruNet as a Reference Tool Goes Beyond Search Engines," Mar. 6, 2003, retrieved Jul. 20, 2004, from http://www.ptech.wsj.com/archive/ptech-20030306.html, pp. 1-3.
Multiplayer Online Games Directory—homepage, retrieved Jun. 8, 2005, from http://www.mpogd.com, 1 page.
Nortel Networks, "Beyond ACD—The advantages of Skill-based Routing in Today's Contact Centers," Mar. 7, 2003, retrieved from http://www.nortelnetworks.com/solutions/ccvp/collateral/nn103640-030703.pdf, 12 pages.
Online Multiplayer Games Network—homepage, retrieved Jun. 8, 2005, from http://www.omgn.com, pp. 1-2.
Project Gutenberg's Distributed Proofreaders—homepage, retrieved Jun. 9, 2005 from http://www.pgdp.net/c/default.php, pp. 1-4.
Rhodes, B., "The Wearable Remembrance Agent: A System for Augmented Memory," Appeared in *Personal Technologies Journal Special Issue on Wearable Computing 1*:218 224, 1997, retrieved Jun. 9, 2005, from http://www.bradleyrhodes.com/Papers/wear-ra-personaltech/, 10 pages.
SERENA Software, Inc., "Serena™ Automating Change," retrieved Jun. 9, 2005, from http://www.serena.com, 1 page.
SETI Institute homepage, retrieved Jun. 9, 2005, from http://www.seti.org/site/pp.asp?c=ktJ2J9MMIsE&b=178025, pp. 1-3.
Siebel Systems, Inc., Siebel homepage, retrieved Jun. 8, 2005, from http://www.siebel.com/, pp. 1-3.
Singh, P., "Open Mind: common sense—Teaching computers the stuff we all know," retrieved Jun. 9, 2005, from http://commonsense.media.mitedu/cgi-bin/search.cgi, pp. 1-2.
Singh, P., "The Open Mind Common Sense Project," Jan. 2, 2002, retrieved Jun. 9, 2005, from http://www.kurzweilai.net/articles/art0371.html, pp. 1-24.
Spice, B., "CMU Student Taps Brain's Game Skills," Oct. 5, 2003, retrieved Jun. 8, 2005, from http://www.post-gazette.com/pg/03278/228349.stm, pp. 1-5.
Spogg.com—homepage, retrieved Jun. 8, 2005, from http://www.spogg.com, pp. 1-2.
Sun Microsystems, Inc., "Products & Technologies—Java Technology," retrieved Jun. 9, 2005, from http://java.sun.com, pp. 1-2.
Sun Microsystems, Inc., "The Jini Technology Series: JavaSpaces Principles, Patterns, and Practice," retrieved Jun. 9, 2005, from http://java.sun.com/docs/books/jini/javaspaces/, pp. 1-2.
TopCoder, Inc., TOPCODER homepage, retrieved Jun. 8, 2005, from http://www.topcoder.com/, pp. 1-2.
University of California, "What is SETI@home?," retrieved Jun. 9, 2005, from http://setiathome.ssl.berkeley.edu./, 1 page.
Wilson, B. "Anti-Social Software, "Apr. 30, 2004, retrieved Aug. 26, 2005, from http://www.brendonwilson.com/profile/000156.shtml, 5 pages.
Wolverton, T., et al., "Yahoo Launches Advice Site," Apr. 29, 2002, retrieved Apr. 29, 2004, from http://news.com.com/2102-1017_3-894968.html?tag+st.util.print, pp. 1-2.

\* cited by examiner

US 9,026,483 B1

AUTOMATIC PREDICTION OF ASPECTS OF HUMAN TASK PERFORMANCE

TECHNICAL FIELD

The following disclosure relates generally to facilitating human performance of tasks based at least in part on automatically generated predictions related to task performance.

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such Web-based interactions between computers (e.g., interactions initiated by users using Web browser applications to interactively request Web pages from Web servers), various distributed computing systems are known in which multiple computer systems interact in other manners in order to achieve a goal. For example it is often desirable for an application program on a computer system to interact with remote systems and applications in order to obtain various types of information and functionality that are not part of the application program. By performing such interactions, an application program may be able to leverage information and functionality from vast numbers of other computer systems over the Internet or other networks. In order to enable such interactions between remote computer systems and application programs, various programmatic interaction mechanisms have been developed. For example, remote procedure call ("RPC") protocols have long existed that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, UPnP ("Universal Plug and Play") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Unfortunately, while Web services and other programmatic interaction mechanisms allow various application programs and computers to interact, such interactions are typically limited in various ways. For example, the types of information and functionality that are available to be requested using such programmatic interactions are typically restricted to very limited types of requests that the remote computer systems and applications can automatically fulfill (e.g., to provide a specified predefined group of information, such as a Web page or file, or to perform a specified database query on a specified database). Moreover, there is a very large class of tasks which computers and application programs cannot easily automatically perform, but which humans can typically easily perform, referred to herein as "human performance tasks." This is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

However, existing settings that allow parties to make tasks available for performance by human users also have various problems. One example of a problem that arises in the context of human performance of tasks is that of providing transparency to participants, such as to better enable the participants to make decisions regarding how and when to make tasks available and to select how and when to perform available tasks.

DETAILED DESCRIPTION

Figure 1:
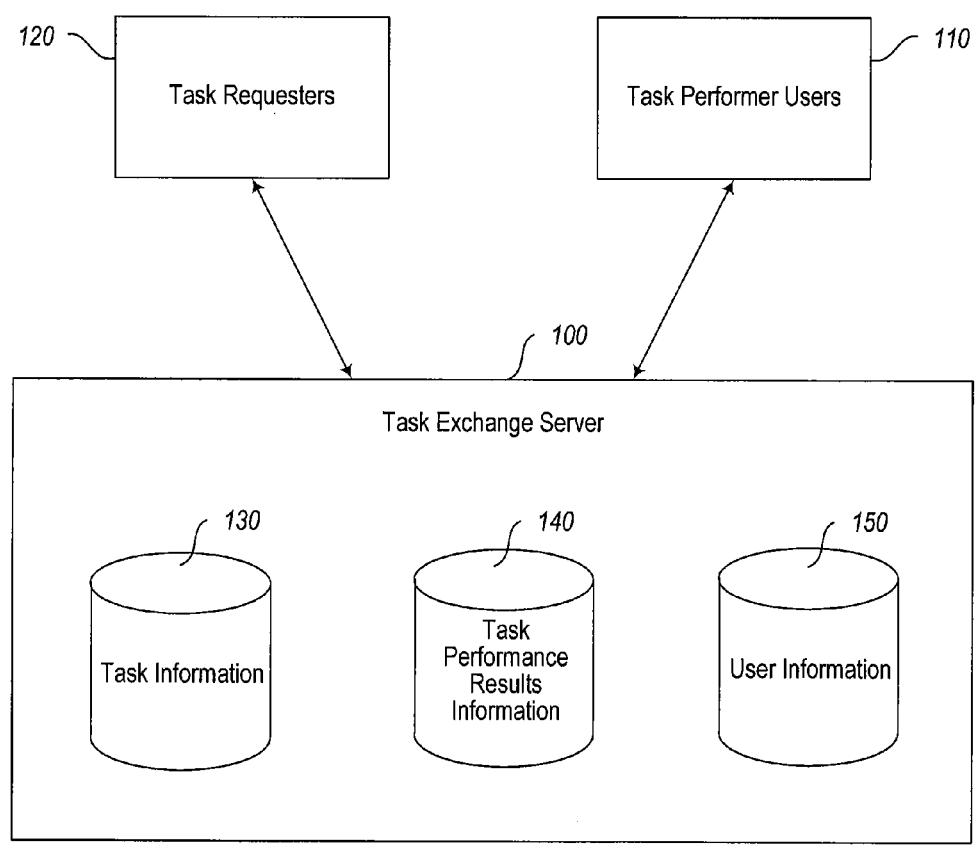
FIG. 1 is a block diagram illustrating an example embodiment of a system that facilitates human performance of tasks.

Techniques are described for facilitating interactions between task requesters who have tasks available to be performed and human task performer users who are available to perform tasks, such as interactions that involve task performer users performing tasks supplied by task requesters. In at least some embodiments, the performance of tasks is facilitated based at least in part by automatically generating predictions about how and when task performance will occur, and providing information about the generated predictions to at least some participants (e.g., to task requesters to enable them to better control performance of their tasks based on various types of information associated with the tasks). At least some of the tasks to be performed in at least some embodiments are human performance tasks that use cognitive and other mental skills of human task performers, such as to employ judgment, perception and/or reasoning skills of the human task performers. In addition, in at least some embodiments, an electronic task exchange server system acts as an intermediary to allow task requesters and task performer users to interact, and automatically performs at least some of the described techniques to facilitate task performance, such as to automatically generate predictions related to task performance and/or to use generated prediction information to facilitate task performance.

As noted, in some embodiments, the task exchange server system (also referred to as a "task exchange server") automatically facilitates the performance of tasks by automatically generating predictions about performance of tasks, and then using the generated task performance prediction information in various ways. For example, as tasks are performed via the task exchange server, the task exchange server may track various information about the tasks and about how the performance of the tasks occurs. The tracked information may then be analyzed by the task exchange server to identify relationships between various information related to the tasks and to corresponding information about the performance of the tasks. Based on the identified relationship information, the task exchange server may automatically generate predictions regarding how performance of additional tasks will occur in the future, such as by determining task performance information that corresponds to information available about the additional tasks. The automatically generated task performance prediction information may then be used to facilitate performance of tasks in various manners in various embodiments. Additional details related to the generation of task performance prediction information and to the use of generated performance prediction information are discussed in greater detail below.

A variety of types of information about tasks may be tracked and analyzed in at least some embodiments. For example, in at least some embodiments, one or more of a variety of task attributes are tracked and analyzed. Such task attributes for a task may include, for example, one or more of the following: a indication of when the task is to be performed (e.g., a final deadline time by which the performance of the task must be complete, such as a task expiration time, and/or a performance duration amount of time that a task performer user has to complete the task once the task performer user selects to perform the task); an indication of a price to be paid to one or more task performer users who successfully perform the task (e.g., a monetary fee or other reward); an indication of one or more qualifications and/or characteristics that are needed by one or more task performer users who perform the task; an indication of a manner in which performance of the task is to occur (e.g., to analyze or manipulate an indicated type of information or to otherwise perform one or more indicated types of actions, an indication of a geographical location or area at which the task performance is to occur, an indication of a minimum level of quality of results of the performance of the task, an indication of a format for and/or other manner of providing results of performance of the task, an indication of one or more capabilities and/or other current characteristics of one or more devices to be used as part of performing the task, etc.); an indication of one or more other related tasks (e.g., based on being part of a group of tasks, being in one or more categories of tasks, being of one or more types of tasks, etc.); an indication of the task requester that supplied the task; and other information that describes or characterizes the task.

In at least some embodiments and situations, a particular task attribute may have multiple possible values (e.g., a price-related task attribute may have various monetary amounts as possible values), while in other embodiments and situations multiple attributes that each have a single possible value may instead be used (e.g., a first price-related task attribute that represents a first price, a second price-related task attribute that represents a second price, etc.). In addition, task attributes may be associated with a task in various ways in various embodiments, such as by being specified by the task requester that supplied the task, by being automatically indicated by the task exchange server for the task, by being suggested or indicated by one or more task performer users or other users (e.g., by task performer users who have expressed an interest in performing the task, such as by submitting a bid or proposal for terms related to performance of the task, such as a price and/or timing), or otherwise being associated with the task based on its relationship to other entities (e.g., by being part of a group of tasks, category of tasks, and/or type of task, based on the task requester that supplied the task, etc.). Furthermore, in at least some embodiments, the task attributes to be tracked and/or analyzed may be selected based at least in part on the ability of the task attributes to affect the performance of the tasks, such as to track and/or analyze task attributes for a task that reflect information that is available to task performer users who select whether to perform the task (e.g., to exclude information for a task regarding how the task requester and/or task exchange server determine whether results of performance of the task are satisfactory). However, at least some such information that is not explicitly available to task performer users may nonetheless be reflected in task performance information (e.g., if a particular task requester develops a reputation among task performer users as being reluctant to pay for legitimate results based on an overly stringent hidden results validation policy, and thus the demand for a task from that task requester will suffer despite the results validation policy being hidden), and thus in some embodiments the task attributes that are tracked and analyzed may include any information that is available related to the tasks. In addition, in at least some embodiments, the task attributes to be tracked and/or analyzed may be selected based at least in part on being of interest to task requesters and/or to task performer users, such as based on indications received from the task requesters and/or task performer users, or as otherwise determined by the task exchange server.

A variety of types of information about performance of tasks may also be tracked and analyzed in at least some embodiments. For example, in at least some embodiments, one or more of a variety of task performance parameters are tracked and analyzed, such as for task performance parameters that each measure or otherwise reflect one or more aspects of the performance. Such task performance parameters for a task may include, for example, one or more of the following: an amount of time until the task is performed after it is made available to task performer users; an amount of time until the task is performed after one or more task performer users select the task to be performed or otherwise begin performance of the task; an amount of money paid for performance of the task (e.g., so as to obtain performance within an indicated period of time, so as to obtain performance by an indicated deadline, so as to obtain results of performance that satisfy an indicated measure of quality, etc.); a quality of the results of performance of the task; a quantity of task performer users who select the task for performance or otherwise express interest in performing the task; and other information that describes or characterizes performance of the task.

In at least some embodiments and situations, a task performance parameter may have multiple possible values (e.g., a task performance parameter related to performance results quality may have various quality levels as possible values), while in other embodiments and situations multiple task performance parameters that each have a single value may instead be used (e.g., a first performance results quality task performance parameter that represents a first quality level, a second performance results quality task performance parameter that represents a second quality level, etc.). In addition, in at least some embodiments, the task performance parameters to be tracked and/or analyzed may be selected based at least in part on the ability of the task performance parameters to measure or otherwise reflect aspects of the performance of tasks that are of interest to task requesters and/or to task performer users, such as based on indications received from the task requesters and/or task performer users, or as otherwise determined by the task exchange server.

The information that is tracked about performance of tasks may be analyzed in various ways in various embodiments to identify relationships between information related to the tasks and to corresponding information about the performance of the tasks, such as to identify relationships between task attributes and corresponding task performance parameters. For example, in some embodiments, data mining analysis techniques may be used to identify one or more task attributes that have an effect on one or more task performance parameters of interest, and/or to identify one or more task performance parameters that are influenced by one or more task attributes of interest. Such analysis of tracked information may further be performed at various times in various embodiments, such as a single time, or instead repeatedly (e.g., to reflect additional tracked information that has become available since a prior analysis) or upon request. In addition, after one or more task attributes of interest have been identified (whether by data mining or in another automated manner, or instead based on a manual indication, such as from a task requester or operator of the task exchange server), the tracked information about the task attributes of tasks and the task performance parameters from performance of those tasks may be analyzed in order to identify relationships between particular task attributes and corresponding task performance parameters, such as causal relationships or other correlations between particular task attributes and task performance parameters, or other patterns that correspond to particular task attributes and/or task performance parameters. A variety of types of statistical analyses and other types of analyses may be performed to identify relationships between particular task attributes and corresponding task performance parameters, including linear regression, nonlinear regression, segmented regression, empirical Bayes methods, etc.

Based on the relationships identified between task attributes and task performance parameters, predictions regarding performance of additional tasks in the future may be automatically generated in various ways in various embodiments. For example, given an indication of one or more task attributes (e.g., for one or more indicated tasks that have not yet been performed), the identified relationship information may be used to predict the values of one or more associated task performance parameters that are likely to occur during or otherwise result from future performance of one or more tasks with those indicated task attributes. Thus, in some embodiments, a task requester (or other user) may be allowed to indicate one or more task attributes (e.g., by indicating one or more tasks that have the one or more task attributes), and receive information about predicted task performance parameter values that are likely to result if task(s) having those indicated task attributes are performed in the future. In this manner, the task requester (or other user) may obtain information about predicted task performance information, and may further determine how modifications to task attributes may cause changes in resulting predicted task performance parameter values. Thus, as one specific example, a task requester may consider different combinations of an associated price and task performance deadline for one or more tasks that the task requester is planning on supplying to the task exchange server, so as to obtain optimized or otherwise desired resulting values for one or more task performance parameters of interest (e.g., a level of quality of task performance results).

Predicted task performance information may take various forms in various embodiments. As one specific example, the predicted information for a particular task performance parameter may be represented as a distribution of possible parameter values with associated likelihoods that correspond to a particular task attribute value or a particular combination of multiple task attribute values. Furthermore, the predicted information for a particular task performance parameter may further illustrate likely changes in the parameter values that result from changes in values of a particular task attribute or of a particular combination of multiple task attributes. In this manner, a task requester may be able to obtain information that indicates how changes in a particular task attribute value (e.g., a deadline for performing a task) are likely to affect the resulting value for a particular task performance parameter (e.g., a price that will need to be paid to obtain successful performance of the task by that deadline). In addition, in some embodiments and situations, the generation of predicted task performance information may be performed dynamically in response to receiving a request for the information, while in other embodiments and situations at least some such predicted information may be generated in advance of such requests and stored for later use with such requests (e.g., to predict one or more task performance parameter values for some or all task attribute values, whether individually or in combination with values for other task attributes).

In addition to or instead of using predicted task performance information to respond to particular requests from task requesters, predicted task performance information may be used in a variety of additional manners in at least some embodiments. For example, in some embodiments, the task exchange server may make similar requests for predicted task performance information for particular tasks and/or task attributes, such as to facilitate performance of tasks that have already been supplied to the task exchange server (e.g., by considering the effect of modifying one or more attributes of those tasks to achieve a desired level or type of performance, such as in accordance with prior instructions from or other agreement of the task requester(s) that supplied the tasks), to consider the effect on the operation of the task exchange server of additional tasks that may be supplied to the task exchange server (e.g., as part of determining whether and/or how to allow such additional tasks to be supplied), etc. Furthermore, predicted task performance information may be used for a variety of types of longer-term planning actions in at least some embodiments, such as for the task exchange server to determine types of resources and/or functionality to provide (e.g., to determine to recruit additional task performer users if predicted task performance information indicates a pattern on lengthening time to complete task performance based on projected types and/or numbers of tasks that are expected to be received in the future), and/or for one or more task requesters to determine whether and how to supply multiple tasks over a future period in order to achieve desired goals for task performance.

In addition, other types of analyses of tracked information may be performed and used in at least some embodiments. For example, information may be tracked about task performer users who perform particular tasks and/or about the collection of task performer users who are available to perform particular tasks, such as information about qualifications of the task performer users related to performing tasks and/or information about other characteristics of the task performer users (e.g., demographic information). Such tracked information about the task performer users may similarly be analyzed in order to identify relationships between particular types of task performer user information and corresponding task performance parameters (e.g., to identify correlations between qualifications and/or characteristics of task performer users who are available to perform tasks during a particular period of time, and task performance parameter values for tasks that are performed during that time period, or to identify other patterns that correspond to particular task performer user qualifications and/or characteristics). Such identified relationships regarding the task performer user information may then be used in a similar manner to generate predictions about performance of tasks, such as based at least in part on task performer users who are available to perform the tasks (e.g., to predict performance information based on task performer users who are currently available to perform tasks and/or on all current task performer users of the task exchange server even if not currently available to perform tasks, or to predict performance information for a particular future time based on information about task performer users who are expected to be available at that future time). Such generated task performance prediction information based on task performer user information may be used instead of or in addition to generated task performance prediction information based on task attribute information, such as in response to requests from task requesters and/or the task exchange server, for the purpose of longer-term planning, etc.

In other embodiments, the automated generation and use of task performance prediction information may be performed in other manners. For example, in some embodiments, after generating predicted task performance information, the task exchange server may perform actions to improve or otherwise modify the generated predicted task performance information and/or the process of predicting such information. As one example, the task exchange server may use automated learning techniques to improve the prediction information generation process, such as by monitoring whether actual performance of tasks occurs as predicted, and making adjustments to the prediction information generation process to reflect differences between the predicted performance information and actual performance information. Furthermore, in some embodiments the generated predicted task performance information and/or the process of predicting such information may be improved based on additional information that is received, such as to use information that a task requester supplies regarding expected future task performance information for one or more tasks (e.g., by adjusting the predicted task performance information that would otherwise be generated to reflect the supplied information).

In addition, in some embodiments the generation and use of task performance prediction information may be performed for only a subset of task attributes, task performance parameters, and tasks, such as a subset that is predetermined by the task exchange server. In addition, in some embodiments, if multiple types of task share one or more common task attributes, relationships between those common task attributes and corresponding task performance parameters will be identified regardless of task type, while in other embodiments such a common task attribute will be analyzed and used separately for some or all of the multiple task types. Furthermore, the task exchange server may support tasks on a large number of types and/or categories, but the generation and use of task performance prediction information may be performed for only some task types or categories. A non-exclusive list of example task types and categories is as follows: identify objects in photos or other images; transcribe audio information; transcribe video information; translate information between languages; change information from one format to another; complete a survey or poll; determine relevance of keywords specified for a search; retrieve indicated data; validate supplied data; generate content (e.g., photos, text, etc.); select one or more groups of visual information (e.g., photographs or other images) and/or audio information (e.g., songs, voice messages, etc.) that satisfy a specified criteria (e.g., to identify groups that are similar, that have specified characteristics, etc.); categorize supplied information; etc.

As previously noted, in at least some embodiments, the described techniques may be performed by an electronic task exchange server system that acts as an intermediary to allow task requesters and task performer users to interact. In particular, in some embodiments, one or more computing systems providing the task exchange server act as an intermediary to allow task requesters to programmatically request (e.g., via programmatic invocations of one or more APIs of the task exchange server by application programs of the task requesters) that tasks be performed by human task performers and to receive corresponding results after the tasks are performed (e.g., as responses to the programmatic invocations), thus providing a form of artificial intelligence to task requesters' application programs. Similarly, human task performer users may access the task exchange server (e.g., in a programmatic or interactive manner) to obtain information about available tasks that they may perform and to provide the results of task performance after the completion of tasks that they are assigned. By enabling a mutable collection of numerous unaffiliated or otherwise unrelated task requesters and task performers to interact via the intermediary task exchange server system in this manner, free-market mechanisms mediated by the Internet or other public computer networks may be used to programmatically harness the collective intelligence of an ensemble of unrelated human task performer users. Additional details related to the function and operation of various embodiments of task exchange server systems, such as a task fulfillment facilitator system embodiment, are included in pending commonly-owned U.S. patent application Ser. No. 10/990,949, filed Nov. 16, 2004 and entitled "Providing an Electronic Marketplace to Facilitate Human Performance of Programmatically Submitted Tasks;" in U.S. patent application Ser. No. 11/535,388, filed Sep. 26, 2006 and entitled "Automated Validation Of Results Of Human Performance Of Tasks;" and in U.S. patent application Ser. No. 11/842,730, filed Aug. 21, 2007 and entitled "Transferring Entity-Related Data Between Storage Partitions;" each of which is hereby incorporated by reference in its entirety.

FIG. 1 is a block diagram illustrating an example of users interacting with a remote system that stores various data and provides various types of functionality, with embodiments of such a system able to use various of the described techniques for facilitating human performance of tasks based at least in part on automatically generated predictions related to task performance. In particular, in this example, the system storing the data is a task exchange server system 100 that provides functionality related to human performance of tasks, such as by managing data related to tasks and to users who supply and/or perform the tasks. For illustrative purposes, some embodiments are described herein in which specific types of users interact with specific types of systems in specific ways, and in which the systems store specific types of data and provide specific types of related functionality, including specific types of techniques for generating and using predicted task performance information. These examples are provided for illustrative purposes and are simplified for the sake of brevity, and the techniques disclosed herein can be used in a wide variety of other situations, some of which are described herein.

The task exchange server 100 may be implemented in various ways in various embodiments, such as in the form of a software system executing on one or more computing systems or devices (e.g., in a distributed manner, such as on a peer-to-peer or grid network). Furthermore, while not illustrated in this example embodiment, in some embodiments data may be stored across multiple alternative storage partitions on multiple alternative computing nodes, such that at least some types of data are stored only on a single partition. For example, data within the system 100 may be organized based on users with which the data is currently associated, so as to store a group of data related to a particular user together on a particular storage partition, and with each user being associated with one of the alternative computing nodes whose storage partition stores data for the user. The associated alternative computing node for a user may further provide at least some of the functionality of the system 100 to the user, such as to process and respond to various types of requests received from the user. In addition, the types of tasks to be performed may have various forms in various embodiments. For example, there is a large class of tasks which computers and application programs cannot easily automatically perform, but which humans can typically easily perform, referred to herein as "human performance tasks." In at least some embodiments, the task exchange server 100 may facilitate the submission and performance of such human performance tasks. The ability of humans to perform such tasks is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

In the example of FIG. 1, the task exchange server 100 includes a task information data repository 130, task performance results information data repository 140, and a user information data repository 150. Various task requesters 120 may interact with the task exchange server 100 in order to supply tasks that are available to be performed by task performer users 110, as well as to perform other related activities. For example, in addition to supplying tasks, a task requester 120 may interact with the task exchange server 100 to obtain results from the performance by one or more task performer users 110 of previously supplied tasks, to obtain information about an account of the task requester (e.g., information about financial payments made to other users for performing tasks supplied by the task requester, information about previously specified preferences, etc.), to search for information about tasks and/or about task performer users who are available to perform tasks, to specify types of qualifications that task performer users may need to perform supplied tasks, to request and receive predicted task performance information, etc. The task requesters 120 may take various forms, such as a task requester user who interactively accesses the system 100 (e.g., via a GUI, or graphical user interface, displayed on a computing system of the task requester user, not shown, such as a GUI based on Web pages provided by the system 100 and/or based on execution of a client-side application on the computing system), or a software application that is programmatically interacting with the system 100 (e.g., via an API of the system 100, not shown) on behalf of a related task requester user.

When a task requester supplies information about one or more tasks, the task exchange server 100 stores the task-related data in the task information data repository 130, which may then be made available to task performer users 110 to perform the tasks in a manner specified by the task requester or otherwise determined by the task exchange server 100. The supplied information that describes a task may include a variety of types of information, including details related to the task (e.g., information to be analyzed, a question to be answered, etc.), one or more geographical locations associated with the task, one or more capabilities and/or other current characteristics of one or more devices to be used as part of performing the task, one or more other criteria related to task performance (e.g., deadlines for completion, format of results from task performance, etc.), one or more associated rewards (e.g., monetary payments) to be provided to one or more task performer users who successfully perform the task, etc., and the task may further have one or more associated qualifications that are needed by any task performer user who performs the task (e.g., as specified by the task requester who supplies the task or otherwise determined by the task exchange server). As previously noted, these and other information related to tasks may in at least some embodiments be used as task attribute information when analyzing information about prior performance of tasks and generating predicted information about future task performance.

The task exchange server 100 also provides various functionality related to the performance of tasks by task performer users 110. For example, when a task performer user requests information about available tasks (e.g., as part of a search or browse request), the task exchange server 100 provides task-related data obtained from the task information data repository 130. In addition, when a task performer user requests to perform (or is assigned for performance) a particular task, the task exchange server 100 stores a temporary association between the task performer user and the task (e.g., in the task performance results information data repository 140). Then, when the task performer user has completed performance of the task, such as by providing task results for the performed task to the task exchange server 100, the task exchange server 100 stores the task results in the task performance results information data repository 140. The task exchange server 100 may also perform other related functions, such as notifying a task requester of the task results and/or completion of the performed task, facilitating a reward for performing the task (e.g., by crediting an account associated with the task performer, initiating a funds transfer, etc.), etc.

The task exchange server 100 also provides various functionality related to the management of various users, such as task requester users and task performer users. For example, such users may register with the task exchange server 100 by providing identifying information (e.g., name, address, telephone number(s), email addresses, etc.), possibly accompanied by various user preference information and/or payment information that may be used to facilitate payments between task requesters and task performer users for the performance of tasks. Such user-related information may be stored by the task exchange server 100 in the user information data repository 150, and the task exchange server system 100 may further in some embodiments store various user-related information in the repository 150 (e.g., information about previously interactions between the system and the user, such as to reflect aggregate information about previous task performance for task performer users). In addition, task performer users may also in at least some embodiments obtain qualifications that may be utilized for purposes of matching task performer users with appropriate tasks, with such qualification information also being stored in the user information data repository 150.

Furthermore, the task exchange server 100 may also provide functionality related to generating and using predicted task performance information in various ways in various embodiments. As previously noted, such predicted task performance information may be dynamically generated in response to requests and/or generated at one or more times in advance of use and stored for such later use. For example, information about identified relationships between task attributes and/or task performer user information and corresponding task performance parameter information, and information about predicted task performance information based on such identified relationships, may be stored in some embodiments as part of the task information 130, or may instead in other embodiments be stored in a distinct database related to predicted task performance information (not shown). In addition, the tracked information about prior performance of tasks may be stored in and retrieved from the task information 130 and task performance results information 140, or may instead in other embodiments be stored in a distinct database (not shown), whether the same distinct database that stores the predicted task performance information or a separate database. As previously noted, task requesters 120 and/or task performer users 110 may access and use such predicted task performance information. In addition, in some embodiments, a component (not shown) of the task exchange server may generate the predicted task performance information, and one or more other components (not shown) of the task exchange server may similarly access and use the predicted task performance information.

Figure 2:
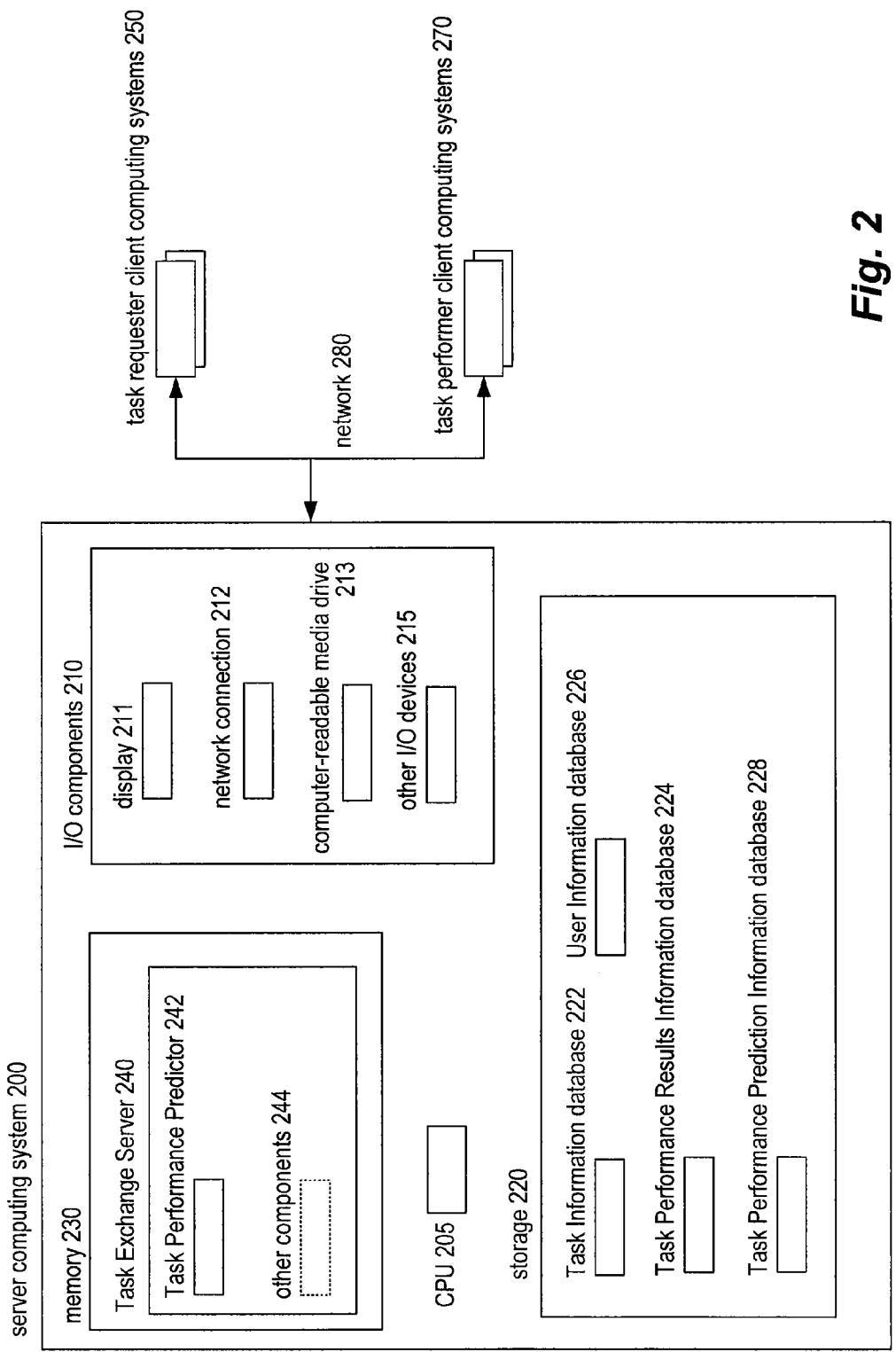
FIG. 2 is a block diagram illustrating a computing system suitable for executing an embodiment of a system that facilitates human performance of tasks based in part on automatically generated predictions related to task performance.

FIG. 2 is a block diagram illustrating a computing system suitable for executing an embodiment of a system that facilitates performance of tasks based at least in part on predicted task performance information. In particular, FIG. 2 illustrates a server computing system 200 suitable for executing an embodiment of a task exchange server system 240, as well as various task requester client computing systems 250, and task performer client computing systems 270. In the illustrated embodiment, the server computing system 200 includes a CPU 205, various I/O components 210, storage 220, and memory 230. The I/O components include a display 211, a network connection 212, a computer-readable media drive 213, and other I/O devices 215 (e.g., a keyboard, mouse, speakers, etc.).

An embodiment of the task exchange server 240 is executing in the memory 230, and it interacts with the other computing systems 250 and 270 over a network 280 using the network connection 212 (e.g., via the Internet and/or the World Wide Web). In the illustrated example, the task exchange server 240 is a software implementation of the task exchange server 100 described with reference to FIG. 1. The illustrated embodiment of the task exchange server system 240 includes a Task Performance Predictor component 242 and optionally one or more other components 244. As described in greater detail elsewhere, the task exchange server may provide various functionality to act as an intermediary to facilitate performance by task performer users of tasks supplied by task requesters, and the component 242 may provide various functionality related to generating and/or using predicted task performance information by implementing at least some of the techniques described herein. The task exchange server 240 and its components may also access and use various task-related and user-related information on storage 220, such as in task information database 222, task performance results information database 224, and user information database 226. The task information database 222, task performance results information database 224, and user information database 226 are respective database systems that may, for example, be used to implement the task information data repository 130, task performance results information data repository 140, and user information data repository 150 described with reference to FIG. 1. In addition, in this illustrative embodiment, the component 242 stores and retrieves information related to the generation and/or use of predicted task performance information in a task performance prediction information database 228 on storage 220.

Human task requester users may use, for example, application programs (not shown) executing on the task requester client computing systems 250 to communicate via the network 280 with the task exchange server 240, such as to submit tasks to be performed and obtain results of performance of such task by task performer users, as well as to in some embodiments request and obtain information related to predicted task performance information. In addition, human task performer users may utilize Web browsers or other programs (not shown) executing on the task performer client computing systems 270 to communicate via the network 280 with the task exchange server 240, such as to perform tasks and provide task performance results, as well as to in some embodiments request and obtain information related to predicted task performance information. The programs used by the task requester users and/or task performer users may, for example, include custom client applications that communicate via standard and/or proprietary protocols with the task exchange server 240 and/or some intermediary application (e.g., a Web server). In some embodiments, the task exchange server 240 may further provide an API that provides programmatic access to at least some of the functionality provided by the task exchange server 240.

It will be appreciated that computing systems 200, 250, and 270 are merely illustrative and are not intended to limit the scope of embodiments of the present disclosure. The task exchange server 240 may instead be executed by multiple interacting computing systems or devices, and computing system 200 may be connected to other devices that are not illustrated, including through one or more networks such as the Internet, via the World Wide Web ("Web"), or other electronic communications network (e.g., cellular based network, public switched telephone network). More generally, a "client" or "server" computing system or computing device or a computing node may comprise any combination of hardware, firmware, or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the task exchange server 240 may in some embodiments be provided via various components, and may be combined in fewer components or distributed in additional components than those described herein. Similarly, in some embodiments, the functionality of some of the components may not be provided as part of the task exchange server 240, and/or other additional functionality may be available. For example, in some embodiments the functionality of the component 242 may be provided separately from that of the task exchange server system 240, such as to provide functionality related to generation and use of predicted task performance information for one or more third-party systems that facilitate execution of tasks (e.g., for a fee).

It will also be appreciated that, while various items are discussed or illustrated as being stored in memory or on storage while being used, these items or portions of them can be transferred between memory and other storage devices for purposes of memory management and data integrity. Alternatively, in other embodiments some or all of the software components may execute in memory on another device and communicate with the illustrated computing system via inter-computer communication. Furthermore, in some embodiments, some or all of the components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as software instructions or structured data) on a computer-readable medium, such as a hard disk, a memory, a network, or a portable media article to be read by an appropriate drive or via an appropriate connection. The system components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 3A:
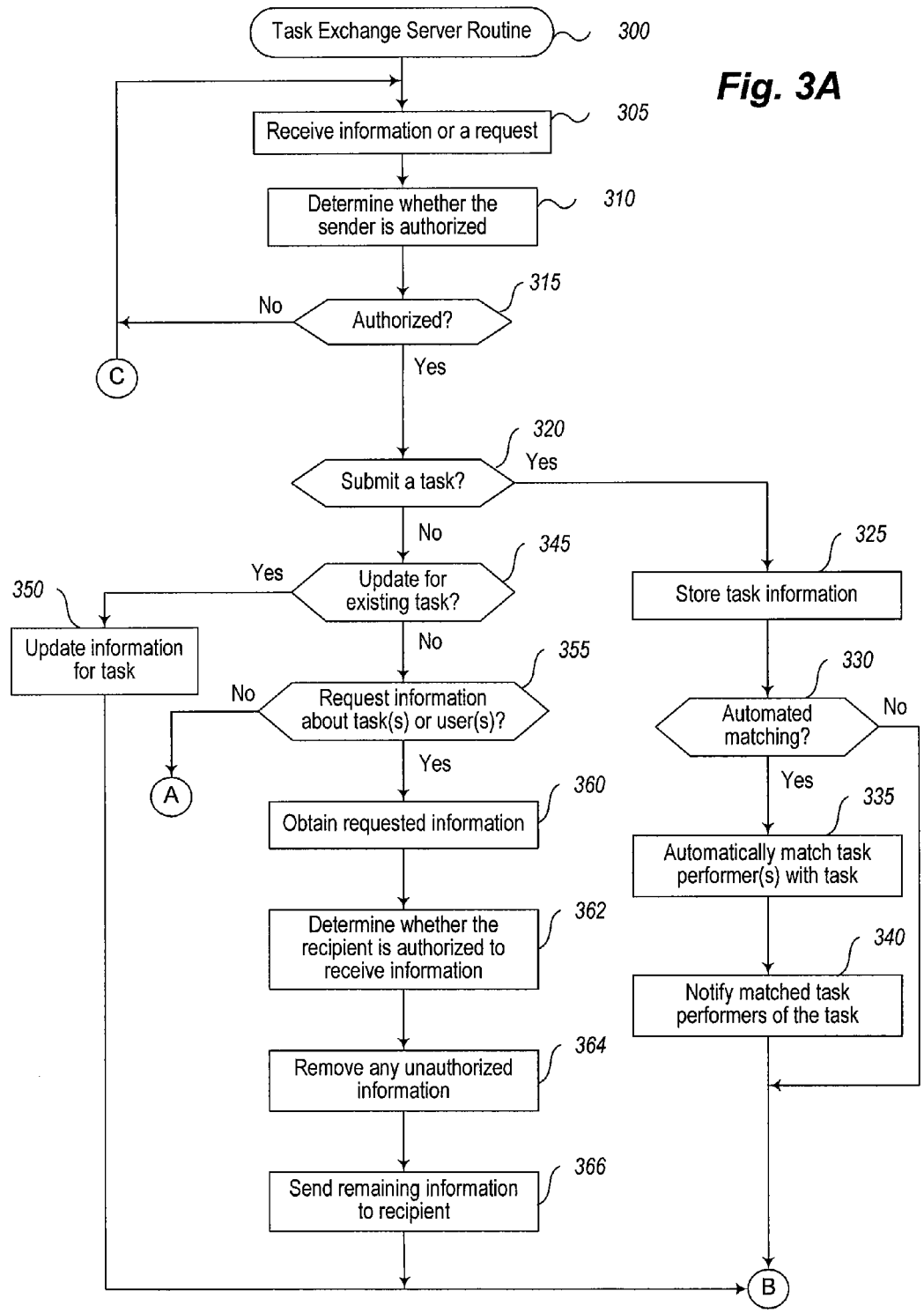
FIGS. 3A and 3B are a flow diagram of an example embodiment of Task Exchange Server routine.
Figure 3B:
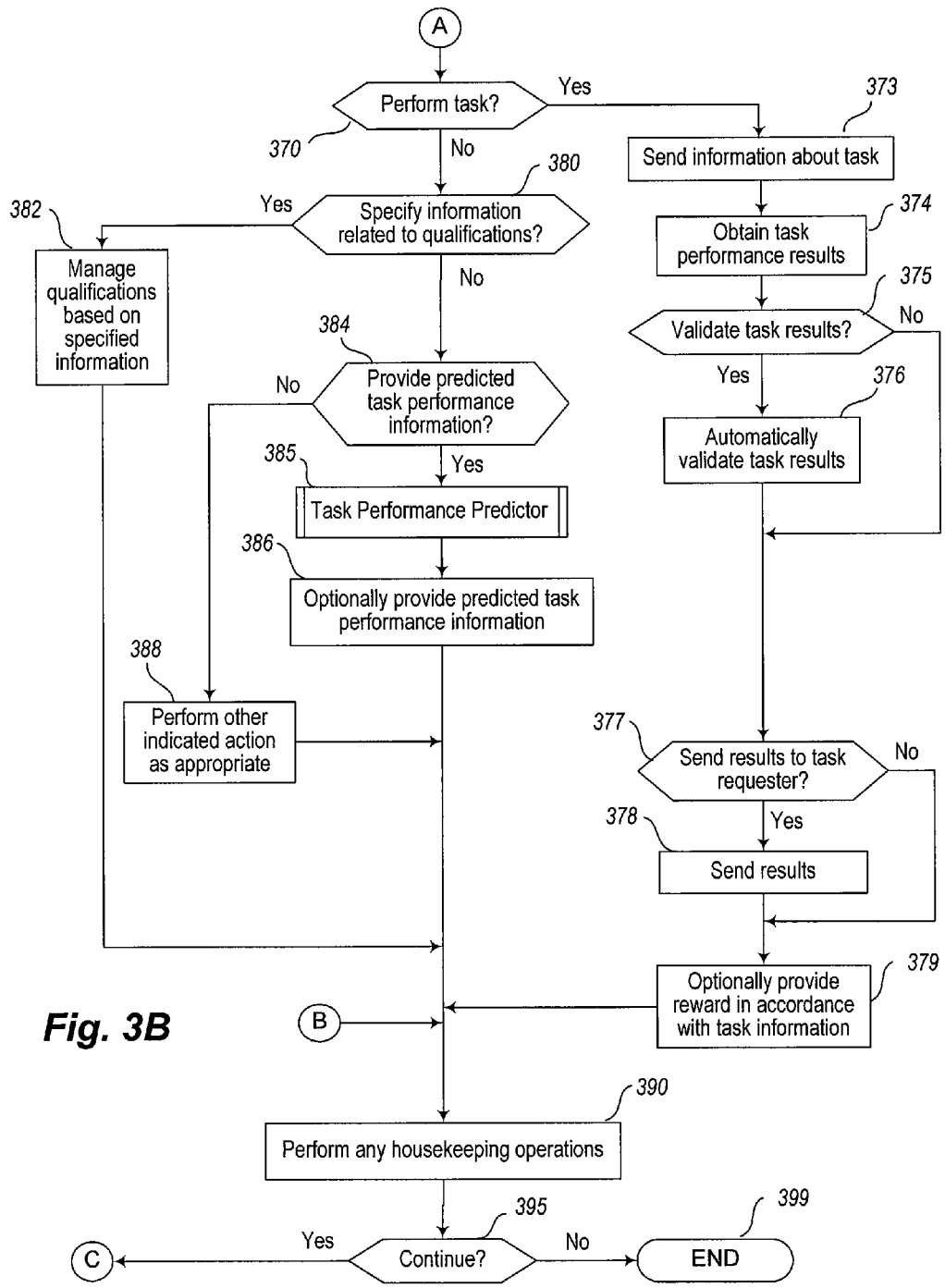

FIGS. 3A and 3B are a flow diagram of an example embodiment of a Task Exchange Server routine 300. The routine may be provided by, for example, execution of an embodiment of the task exchange server 100 of FIG. 1 and/or the task exchange server 240 of FIG. 2, such as to in this illustrated embodiment facilitate performance of tasks by interacting with task requesters and task performer users as appropriate, as well as to generate and use predicted task performance information.

The routine begins at block 305, where an indication is received of information or a request, and in block 310 optionally determines whether the sender of the information or request is authorized to perform requests of that type or provide information of that type (e.g., based on prior registration of the users with the task exchange server system, and/or on other previously defined access controls for specific users or types of users). If the routine identifies the sender as authorized in block 315, or in embodiments in which authorization is not checked, the routine continues to block 320 to determine whether the received indication was a request to submit a task. If so, the routine continues to block 325 to store task information received in block 305, including any specified task performance criteria related to task performance, information about any associated rewards for performance of the task, and any associated information to be analyzed or manipulated as part of the task. The stored task information facilitates later performance of the task, and may further be tracked and later used in analyzing tracked information about prior performance of tasks. The routine then continues to block 330 to determine whether to perform automated matching to identify task performer users who are appropriate to perform the task, such as based on the type of task submitted and/or an explicit request by the submitter of the task, although in other embodiments such automated matching functionality may not be provided. In the illustrated embodiment, if automated matching is to be performed, the routine continues to block 335 to automatically match one or more task performer users with the task by, for example, identifying one or more task performer users whose qualifications satisfy any qualification criteria for the new task. The routine then notifies those identified task performer users of the task in an appropriate manner in block 340 (e.g., based on previously specified user preferences for those task performer users). After block 340, or if it was instead determined in block 330 that automated matching was not to be performed, the routine continues to block 390.

If it was instead determined in block 320 that the received indication was not to submit a task, the routine continues instead to block 345 to determine whether a request was received to perform an update for an existing task, and if so continues to block 350 to perform the update as appropriate. Such updates may take a variety of forms, such as to modify information about or delete a pending task that has not been performed (e.g., to modify one or more task attributes for a task as initiated by the task exchange server or by the task requester that supplied the task, such as based on use of predicted task performance information that indicates that the modified task attributes will likely result in improved task performance with respect to one or more task performance parameters of interest); to perform an indicated activity related to a task (e.g., to cause a reward to be provided to a task performer user after the task requester has reviewed and accepted task performance results from that task performer user); to add, modify, or remove performance criteria associated with an existing task; etc. If it was instead determined in block 345 that the received indication was not to update an existing task, the routine continues to block 355 to determine whether the received indication was a request for information about one or more tasks and/or one or more users, such as for a search or browse request. If so, the routine continues to block 360 to identify and obtain the requested information, and then continues to block 362 to determine whether the indicated recipient of the information is authorized to receive all of the obtained information, such as based on access controls associated with any aspects or elements of the obtained information (although in other embodiments the access determination may be made before or as part of the obtaining of the information, or may not be performed). In block 364, the routine then removes information for which the recipient is not authorized, if any, and in block 366 sends any remaining information to the recipient. In some embodiments, indications may be provided to the recipient of any removed information for which they were not authorized, while in other embodiments such indications may not be provided. After blocks 350 or 366, the routine continues to block 390.

If it was instead determined in block 355 that the received indication was not a request for information about tasks or users, the routine continues instead to block 370 to determine whether the received indication was a request from a task performer user to perform an indicated task. If so, the routine continues to block 373 to retrieve and provide information about the task to the task performer user in an appropriate manner (e.g., in a manner specified for the task), and in block 374 obtains results of performance of the task by the task performer user. It will be appreciated that the obtaining of task performance results may occur substantially after the sending of the task information in block 373 (e.g., if the duration of task performance is lengthy), and thus in some embodiments the routine may asynchronously proceed to perform other operations in response to other requests or receipt of information while waiting for the task performance results. In addition, the obtained task performance results and other information related to the performance may be tracked and later used in analyzing tracked information about prior performance of tasks. In block 375, the routine then determines whether to validate the task results, such as based on whether a task requester has specified that the results for the task are to be validated or as automatically determined by the task exchange server. If so, the routine continues to block 376 to automatically validate task results. Validating task results may be performed in various ways, such as type checking the task results (e.g., by determining whether the task result comprises an integer or other type of data), range checking the task results (e.g., by determining whether a task result is within a particular value range), determining whether the task results satisfy one or more other validation criteria specified by the task requester, etc.

After block 376, or if it was instead determined in block 375 not to validate the task results, the routine continues to block 377. In block 377, the routine then determines whether to immediately send the task results to the task requester, such as based on information associated with the task, the outcome of the automated validation of block 376 (e.g., to not send the results if the task performance results fail validation and are discarded, and the task is made available for performance by another task performer user), and/or user preferences for the task requester. If so, the routine continues to block 378 to send the results. After block 378, or if it was instead determined in block 377 not to send the results to the task requester at this time, the routine continues to block 379 to optionally provide any reward associated with the task to the task performer user, such as in accordance with the task information and/or the outcome of the automated validation of block 376 (e.g., to not provide a reward that would otherwise have been provided if the validation fails). After block 379, the routine continues to block 390.

As previously noted, while the illustrated embodiment indicates a synchronous flow in which the routine waits for and obtains task performance results in block 374 after sending the task information in block 373, in other embodiments the routine may be structured in other manners, such as to continue with other processing while waiting for such task results (if any) to be received. In addition, in some situations, task performer users may not provide task results for a task after they accept an assignment to perform the task, which may be indicated to the routine in an explicit message from the task performer user that the task performer user is abandoning or withdrawing from task performance, or instead by not receiving task results within a specified period of time—if so, the routine may continue to handle other task-related requests and information. In addition, while not illustrated here, in other embodiments various types of notifications may be sent to task requesters related to their submitted tasks, such as when a task is assigned to a task performer user for performance and/or when an assigned task is withdrawn from a task performer user who has not completed the performance.

If it was instead determined in block 370 that the received indication was not to perform a task, the routine continues instead to block 380 to determine whether the received indication is to specify information related to user qualifications, and if so continues to block 382 to manage qualifications based on the specified information. Managing qualifications may include, for example, defining a new type of qualification for use with the system, specifying a particular qualification for a particular user, removing a particular qualification from a user, removing a particular qualification from the system, etc.

If it was instead determined in 380 that the received indication was not to specify qualification-related information, the routine continues instead to block 384 to determine whether to provide predicted task performance information in response to a request, such as a request from a task requester or other user. If so, the routine continues to block 385 to execute a Task Performance Predictor routine, such as the routine 400 described with respect to FIG. 4. After block 385, the routine continues to block 386 to optionally provide predicted task performance information received from performance of block 385 to the user from whom the request for the predicted task performance information was received. If it was instead determined in 384 that the received indication was not to request predicted task performance information, the routine continues instead to block 388 to perform another indicated operation as appropriate, such as to receive and store various types of user information (e.g., information related to a user's identity or attributes, information related to an account of a user with the system, information related to specifying access controls for information and/or functionality, etc.), respond to received administrative requests related to system operations, respond to received user requests for information related to monitoring performance of tasks or other operations of the system, respond to received requests or information related to performance of tasks (e.g., based on a task performer user indicating a withdrawal from or abandonment of an assignment to perform a task), respond to instructions from an operator of the task exchange server or other user to perform an analysis of tracked information about prior performance of tasks in order to support prediction of task performance information (e.g., by performing a Task Performance Predictor routine, such as the routine 400 described with respect to FIG. 4), etc.

Figure 4:
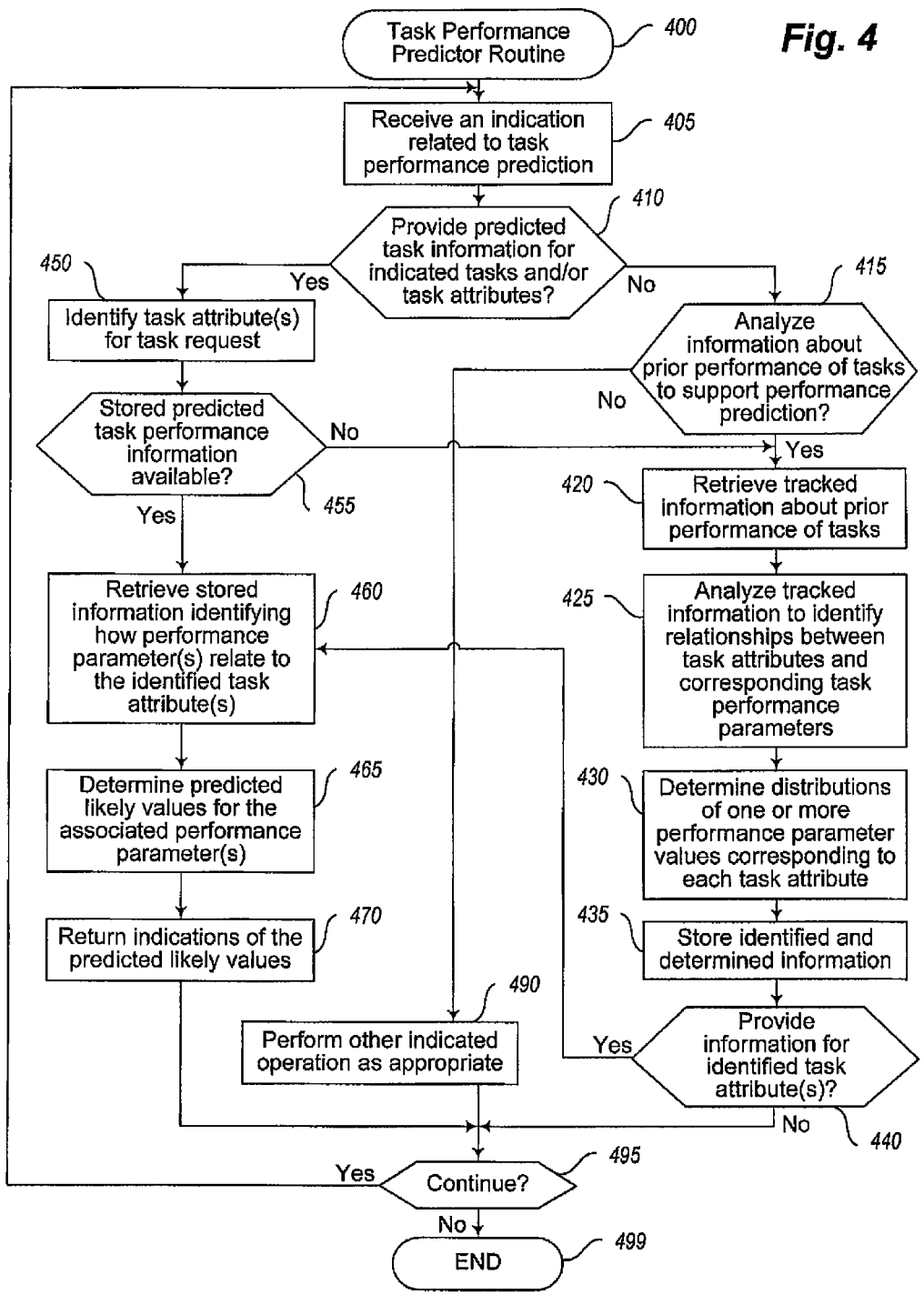
FIG. 4 is a flow diagram of an example embodiment of a Task Performance Predictor routine.

After blocks 350, 366, 379, 382, 386, or 388, the routine continues to block 390 to optionally perform any additional housekeeping operations, such as to store information that is generated or received during execution of the routine; to generate summary aggregate information for the system related to tasks and users; to take appropriate actions when events do not occur within specified periods of time (e.g., to withdraw assigned tasks from task performer users who do not timely perform the tasks, or to provide rewards to task performer users for tasks that they have performed when task requesters do not timely reject the task results provided by the task performer users); to periodically perform an analysis of tracked information about prior performance of tasks in order to support prediction of task performance information, such as if a predetermined amount of time has passed since a prior analysis and/or if a predetermined amount of additional tracked information about task performance has become available since a prior analysis (e.g., by performing a Task Performance Predictor routine, such as the routine 400 described with respect to FIG. 4); etc. After block 390, the routine continues to block 395 to determine whether to continue. If so, or if it was determined in block 315 that the sender was not authorized, the routine returns to block 305, and if not continues to block 399 and ends. While the illustrated embodiment may include tasks being specified one at a time, in other embodiments tasks may instead be specified in other manners, such as to allow multiple tasks to be submitted together (e.g., to allow for batch processing), whether or not those tasks are related to each other.

FIG. 4 is a flow diagram of an example embodiment of a Task Performance Predictor routine 400. The routine may be provided by, for example, execution of the Task Performance Predictor component 242 of FIG. 2 and/or an embodiment of the task exchange server 100 of FIG. 1, such as to in this illustrated embodiment facilitate performance of tasks by generating and using predicted task performance information.

The routine begins at block 405, where an indication is received of information or a request related to task performance prediction information. The request may, for example, be from a task requester that specifies one or more task attributes (e.g., by specifying one or more tasks that have those attributes) and requests predicted task performance information that would indicate likely performance aspects if such one or more tasks were currently supplied to the task exchange server and made available to task performer users, or alternatively if such one or more tasks were supplied to the task exchange server and made available to task performer users at an indicated future time. Such a request, or alternatively a request from another user or from the task exchange server, may alternatively request and obtain information about multiple values (e.g., all possible values) of one or more task attributes, such as to obtain information about how values for one or more task performance parameters will vary as the values for the one or more task attributes change. Alternatively, the request received in block 405 may be an indication for the routine 400 to analyze tracked information about prior performance of tasks, such as to identify relationships between task attributes and task performance parameters that may be used to generate predicted task performance information.

In the illustrated embodiment, the routine then continues to block 410 to determine whether the indication received in block 405 was a request to provide one or more types of predicted task information for one or more indicated tasks and/or indicated task attributes, such as may be received from routine 300 illustrated in FIGS. 3A and 3B via block 385. If not, the routine continues instead to block 415 to determine whether the received indication was to analyze tracked information about prior performance of tasks to support task performance prediction, such as based on a request from a user or an automated determination by the task exchange server to perform the analysis. If so, the routine continues to block 420 to retrieve tracked information about prior performance of tasks, such as for all tasks and/or task attributes, or alternatively for a subset of task and/or task attributes if so indicated in the request (e.g., based on time of task submittal to the task exchange server and/or task performance, based on task type or category, based on particular indicated task attributes and/or task performance parameters, etc.). In block 425, the routine then analyzes the tracked information to identify relationships (e.g., correlations) between task attributes and corresponding task performance parameters, such as described in greater detail elsewhere. In block 430, the illustrated embodiment of the routine then determines particular predicted likely values for one or more task performance parameters that correspond to one or more particular task attributes or task attribute values, such as to generate a distribution of multiple possible values for a particular task performance parameter along with associated metadata regarding the likelihood of the particular values based on one or more corresponding task attribute values or other conditions (e.g., information about current or expected task performer users at a time of task performance). In block 435, the routine then stores the information identified in block 425 and determined in block 430 for later use. In other embodiments, the determination of particular predicted likely task performance parameter values may be performed at other times or in other manners, such as to dynamically determine particular predicted likely task performance parameter values for particular indicated task attributes and/or task attribute values at a time of a request for those values.

After block 435, the routine continues to block 440 to determine whether to provide any of the identified and/or determined information to any recipients, such as if blocks 420-435 are performed dynamically as part of a response to a request for which one or more task attributes of interest are identified in block 450. If so, the routine continues to block 460. In other embodiments, other types of recipients may further receive some or all of the information identified and determined in blocks 425 and/or 430, such as based on prior requests for such information to be pushed or otherwise provided to such recipients when that information is generated (e.g., for each of multiple periodic performances of analysis of tracked information about prior performance of tasks in blocks 420-435).

If it was instead determined in block 410 that the indication received in block 405 was a request to provide one or more types of predicted task information, the routine continues to block 450 to identify one or more task attributes for which predicted likely task performance parameter values will be determined and provided. For example, if one or more task attributes were explicitly indicated in the request received in block 405, those task attributes may be selected. If one or more tasks or other task-related information (e.g., a type of task, a category of tasks, etc.) is indicated in the request received in block 405, one or more task attributes that correspond to that indicated information may be selected. As discussed in greater detail elsewhere, in some embodiments only some task attributes may be considered when generating predicted task performance information, and if so any identified task attributes that differ from those task attributes may be ignored. Alternatively, in some embodiments, no task attributes may be explicitly identified or indirectly referred to in the received request, and if so predicted task performance information corresponding to all available task attributes may be returned. In addition, in other embodiments, a request may indicate one or more task performance parameters of interest, whether in addition to or instead of one or more task attributes or related information, and if so predicted task performance information for those indicated task performance parameters may be determined and provided (e.g., predicted likely values for the indicated task performance parameters for the task attributes identified in block 450, or instead for all task attributes to which those task performance parameters have an identified relationship).

After one or more task attributes are identified in block 450, the routine continues to block 455 to determine whether stored predicted task performance information is available and is appropriate to use (e.g., is sufficiently recent, is not excluded based on an indication in the request to perform a dynamic generation of the predicted task performance information being generated, etc.). If so, the routine continues to block 460 to retrieve stored information identifying how one or more task performance parameters relate to the identified task attributes, such as relationship information that was previously identified in block 425 and stored in block 435, and/or likely task performance parameter values that were previously determined in block 430 and stored in block 435.

The routine then continues to block 465 to determine predicted likely values for the associated task performance parameters (and/or any task performance parameters explicitly identified in the request received in block 405) based on the retrieved information, and in block 470 then returns indications of the predicted likely values to the requester who provided the request received in block 405 (e.g., to block 385 of routine 300). For example, if the retrieved information includes determined likely task performance parameter values that correspond to particular task attributes and/or task attribute values, and if the predicted likely task performance parameter values do not depend on current conditions (e.g., on currently available task performer users) in the current embodiment and/or based on the received request, the appropriate retrieved previously determined likely task performance parameter values may be selected and used. Alternatively, if the retrieved information includes only identified relationship information for the task attributes and task performance parameters of interest, the routine in block 465 may dynamically determine predicted likely values for those task performance parameters based on the identified task attributes in a manner similar to block 430. In embodiments and situations in which current condition information is further considered, such as information related to currently available task performer users, the routine may similarly in block 456 dynamically determine predicted likely values for those task performance parameters based on the current condition information and/or identified task attributes in a manner similar to block 430, or may instead adjust previously determined retrieved information about likely task performance parameters to reflect the current conditions. Similarly, in some embodiments, the request may indicate a particular future time for which the predicted task performance information is to correspond, and if so, any expected current condition information for that future time may be selected and used in determining the predicted likely task performance parameter values information for that particular time.

If it is instead determined in block 455 that stored predicted task performance information is not available or appropriate to use, the routine continues instead to perform blocks 420-435 to dynamically generate information related to the predicted task performance information. As previously noted, when continuing to block 440, the routine will then return to block 460 to retrieve and use that dynamically generated information as part of the determining of the predicted likely values in block 465. In a similar manner, in embodiments and situations in which current condition information is to be considered, the routine may continue from block 455 to perform blocks 420-435 in order to generate predicted task performance information based on such current condition information, which may further be retrieved in block 420 in such embodiments.

If it was instead determined in block 415 that the indication received in block 405 was not to analyze tracked information about prior performance of tasks, the routine continues instead to block 490 to perform one or more other indicated operations as appropriate. For example, the routine may determine to automatically improve future predicted task performance information by using automated learning techniques to compare actual performance information for tasks to predicted performance information for those tasks, to analyze information about relationships of information about available task performer users to task performance parameters corresponding to performance of at least some tasks by at least some of the task performer users, to update previously stored information to reflect updated information (e.g., information received from a task requester, information about currently available task performer users to reflect identified relationships about information for available task performer users and task performer parameters), to perform various types of longer-term planning, such as by identifying tasks that are expected to be received over a future period of time and determining likely resulting predicted task performance parameter value information for those tasks (e.g., to identify resources of the task exchange server to provide during that future period of time so as to cause the predicted task performance parameter values to satisfy desired goals, or to identify constraints or limitations on particular types of tasks that are accepted to be performed during that future period of time so as to cause the predicted task performance parameter values to satisfy desired goals), etc.

After blocks 470 or 490, or if it was instead determined in block 440 to not provide information for one or more identified task attributes, the routine continues to block 495 to determine whether to continue. If so, the routine returns to block 405, and if not continues to block 499 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A computer-implemented method for a task exchange server to automatically facilitate performance of tasks by human task performer users based on automated predictions of task performance parameters related to the performance of the tasks, the method comprising:

automatically facilitating performance of a plurality of tasks of multiple types that are submitted to the task exchange server by multiple task requesters, the plurality of tasks being performed by a mutable collection of multiple human task performer users of the task exchange server who are unaffiliated with the task requesters, the automatic facilitating of the performance of each task being performed by one or more configured computing systems of the task exchange server and including obtaining results of the performance of the task by one or more human task performer users who select to perform the task and providing the obtained performance results to the task requester that submitted the task;

tracking information about the performance of the plurality of tasks, the tracked information including information about attributes of the plurality of tasks that affect their performance based at least in part by being discernible by task performer users who select whether to perform the tasks, the tracked information further including information about values for performance parameters that each measure one or more aspects of the performance of the tasks;

after the performance of the plurality of tasks, automatically analyzing the tracked information in order to determine correlations for each of one or more identified attributes to an identified value for at least one performance parameter, such that the performance of a task having an identified attribute is likely to result in the identified at least one performance parameter value that is correlated to that identified attribute, the automatic analyzing being performed by one or more configured computing systems;

receiving information from a first task requester indicating one or more new tasks that have not yet been performed and that are distinct from the plurality of tasks, the one or more new tasks having indicated attributes that include at least one of the identified attributes;

in response to the received information, automatically predicting likely values for one or more performance parameters that will occur during a possible future performance of the indicated tasks, the automatic predicting being performed by one or more configured computing systems and being based at least in part on the at least one attributes of the indicated new tasks and on the determined correlations, the likely performance parameter values for the possible future performance being predicted without an identification of which human task performer users will select to participate in the possible future performance;

providing the predicted likely performance parameter values to the first task requester; and after the providing of the predicted likely performance parameter values and before performance of the indicated new tasks, receiving from the first task requester one or more submitted tasks to be performed by task performer users, the one or more submitted tasks being an altered version of the indicated new tasks that have one or more altered attributes differing from the indicated attributes, the altered attributes affecting the values that will likely occur for the one or more performance parameters during future performance of the one or more submitted tasks, to enable the first task requester to have enhanced control over performance of tasks.

2. The method of claim 1 wherein the one or more altered attributes include at least one of a specification by the first task requester of when the one or more submitted tasks are to be performed, a specification by the first task requester of a manner in which performance of the one or more submitted tasks is to occur, and a specification by the first task requester of a price to be paid to one or more of the human task performer users to perform the one or more submitted tasks, wherein the one or more performance parameters measure at least one of an amount of time until the one or more submitted tasks will be performed and a quality of results of performance of the one or more submitted tasks, and wherein the method further comprises facilitating performance of the one or more submitted tasks by the one or more human task performer users and providing the results of the performance to the first task requester, the performance resulting in actual values for the one or more performance parameters that differ from the predicted likely performance parameter values.

3. A computer-implemented method for automatically facilitating performance of tasks by human task performer users based on predicted task performance parameters, the method comprising:

tracking information about performance of a plurality of tasks by multiple human task performer users via a task exchange server, the plurality of tasks having been supplied to the task exchange server for performance by multiple task requesters unaffiliated with the multiple human task performer users;

automatically analyzing the tracked information in order to identify correlations between attributes of the plurality of tasks and performance parameters for the plurality of tasks, the attributes of the plurality of tasks reflecting information about the tasks that is available to human task performer users who select whether to perform the tasks, the performance parameters for the plurality of tasks each corresponding to one or more aspects of the performance of the plurality of tasks, the automatic analyzing being performed by one or more configured computing systems;

receiving an indication of one or more tasks that are not yet performed and that have one or more indicated attributes, the indicated tasks being distinct from the plurality of tasks;

after the automatic analyzing of the track information about the performance of the plurality of tasks, automatically predicting likely information about one or more performance parameters for a future performance of the indicated tasks, the automatic predicting being performed by one or more configured computing systems and being based at least in part on the one or more indicated attributes and on the identified correlations from the automatic analyzing; and before performance of the indicated tasks has occurred, providing the predicted likely information about the one or more performance parameters for the indicated tasks, to enable the future performance of the indicated tasks to be altered based on modifications to at least one of the indicated attributes of the indicated tasks.

4. The method of claim 3 wherein the received indication of the one or more tasks is from one of the multiple task requesters, and wherein the providing of the predicted likely information includes providing the predicted likely information to the one task requester.

5. The method of claim 4 further comprising, after the providing of the predicted likely information to the one task requester, receiving from the one task requester one or more supplied tasks to be performed by one or more of the multiple human task performer users, the one or more supplied tasks being an altered version of the indicated tasks so as to have one or more modified attributes that differ from the indicated attributes, the modified attributes affecting performance parameter values that will likely occur during future performance of the one or more supplied tasks.

6. The method of claim 5 further comprising, under control of the one task requester:
receiving the provided predicted likely information about the one or more performance parameters;
determining that the predicted likely information for at least one of the one or more performance parameters is not preferred;
determining to modify one or more of the indicated attributes for the indicated tasks in such a manner as to alter likely information for the at least one performance parameter; and
providing the one or more supplied tasks for performance with the modified one or more attributes.

7. The method of claim 4 wherein the received indication of the one or more tasks from the one task requester is part of a request from the one task requester for the predicted likely information about the one or more performance parameters, the request being made by the one task requester prior to the one task requester submitting the one or more tasks to the task exchange server for performance, the request including an indication of the one or more performance parameters for which the likely information is to be predicted for the future performance.

8. The method of claim 3 wherein the received indication of the one or more tasks includes an indication of a group of multiple tasks of multiple types that are selected to represent tasks that may be received by the task exchange server from multiple task requesters during a future period of time, and wherein the group of multiple tasks is selected by the task exchange server to assess likely behavior of the task exchange server in facilitating performance of the multiple tasks of the group.

9. The method of claim 3 wherein the received indication of the one or more tasks with the one or more indicated attributes is part of receiving multiple groups of alternative attributes for the indicated tasks, wherein the automatic predicting of the likely information about the one or more performance parameters for a future performance of the indicated tasks is performed for each of the multiple groups of alternative attributes so as to generate differing predicted likely information for at least some of the multiple groups of alternative attributes, and wherein the providing of the predicted likely information is performed for each of the multiple groups of alternative attributes, so as to illustrate how the information about the one or more performance parameters is likely to change as attributes for the indicated tasks change.

10. The method of claim 3 wherein the providing of the predicted likely information includes providing the predicted likely information to the task exchange server, and wherein the method further comprises, after the providing, automatically modifying one or more of the indicated attributes for the indicated tasks in such a manner as to alter likely information for at least one of the one or more performance parameters, and facilitating performance of the one or more indicated tasks with the modified attributes by one or more of the multiple human task performer users.

11. The method of claim 3 wherein the one or more performance parameters each measure one or more aspects of performance of tasks, the one or more aspects including an amount of time until the one or more submitted tasks are performed.

12. The method of claim 3 wherein the one or more performance parameters each measure one or more aspects of performance of tasks, the one or more aspects including an amount of money to be paid for performance of a task so as to obtain performance within an indicated period of time and/or to obtain results of performance that satisfy an indicated measure of quality.

13. The method of claim 3 wherein the one or more performance parameters each measure one or more aspects of performance of tasks, the one or more aspects including a quality of results of performance of a task that are obtained.

14. The method of claim 3 wherein the predicted likely information about the one or more performance parameters include one or more predicted likely values for each of the one or more performance parameters.

15. The method of claim 3 wherein the one or more indicated attributes reflect at least one of a specification of a deadline for when the one or more tasks are to be performed, and a specification of a price to be paid to one or more of the human task performer users to perform the one or more tasks.

16. The method of claim 3 wherein the one or more indicated attributes reflect at least one of a category of the one or more tasks, a type of the one or more tasks, a type of information to be analyzed as part of performance of the one or more tasks, one or more qualifications needed by task performer users who perform the one or more tasks, a task requester who supplied the one or more tasks, one or more types of information supplied by the task requester to specify how the one or more tasks are to be performed, and an indicated minimum level of quality of results of the performance of the one or more tasks.

17. The method of claim 3 wherein the analyzing of the tracked information further identifies additional correlations between characteristics of human task performer users who were available to perform the plurality of tasks and the performance parameters for the plurality of tasks, and wherein the automatic predicting of the likely information about the one or more performance parameters for the future performance of the indicated tasks is further based at least in part on information about characteristics of human task performer users who are expected to be available for the future performance of the indicated tasks and on the identified additional correlations.

18. A non-transitory computer-readable medium whose contents configure a computing system to perform a method to automatically facilitate performance of tasks by task performer users based on predicted task performance parameters, the method comprising:
automatically analyzing information about prior performance of a plurality of tasks in order to identify relationships between attributes corresponding to the plurality of tasks and performance parameters for the plurality of tasks, the plurality of tasks having been supplied for performance by one or more task requesters and having each been performed by one or more of plurality of task performer users, the performance parameters for the plurality of tasks each corresponding to one or more aspects of the performance of the plurality of tasks, the automatic analyzing of the information being performed by the configured computing system;

automatically determining predicted information for one or more performance parameters for a future performance of one or more tasks that are distinct from the plurality of tasks and that have not yet been performed, the automatic determining being performed by the configured computing system based at least in part on one or more attributes of the one or more tasks and on the identified relationships; and providing the determined predicted information for the one or more performance parameters so as to enable enhanced control of future performance of one or more tasks.

19. The non-transitory computer-readable medium of claim 18 wherein the computing system is at least part of a group of one or more computing systems that provide a task exchange server to facilitate performance by multiple human task performer users of multiple tasks supplied by multiple task requesters, wherein the attributes corresponding to the plurality of tasks reflect information about the plurality of tasks that is available before the performance of the tasks, wherein the automatic determining of the predicted information for the one or more performance parameters includes dynamically predicting likely values for the one or more performance parameters that will occur during the future performance in response to an indication of the one or more tasks that is received from a task requester, wherein the future performance of the one or more tasks represents performance by a subset of one or more of the multiple human task performer users that is unknown at a time of the dynamic predicting, and wherein the providing of the determined predicted information includes providing the determined predicted information to the task requester that indicated the one or more tasks so that the task requester may control the future performance of the one or more tasks by altering at least one of the one or more attributes of the one or more tasks before the future performance.

20. The non-transitory computer-readable medium of claim 18 wherein the computer-readable medium is a memory of the configured computing system.

21. The non-transitory computer-readable medium of claim 18 wherein the contents are instructions that when executed program the configured computing system to perform the method.

22. A computing system configured to automatically facilitate performance of tasks by task performer users based on predicted task performance information, comprising:

one or more memories; and a task exchange server system configured to facilitate performance of tasks by users, by:

automatically analyzing information about prior performance of a plurality of tasks in order to identify relationships between attributes corresponding to the plurality of tasks and aspects corresponding to the performance of the plurality of tasks, the plurality of tasks being supplied for performance by one or more task requesters and being performed by a plurality of task performer users, the attributes reflecting information about the plurality of tasks that is available before the performance of the tasks;

automatically determining information about a predicted future performance of one or more tasks, the automatic determining being based at least in part on one or more attributes of the one or more tasks and on the identified relationships; and providing the determined predicted future performance information so as to enable enhanced control of actual future performance of the one or more tasks.

23. The computing system of claim 22 wherein the task exchange server system facilitates performance by multiple human task performer users of tasks that are each supplied by one of multiple task requesters, wherein the automatic determining of the information about a predicted future performance of one or more tasks includes dynamically predicting likely performance parameter values for the actual future performance of the one or more tasks in response to an indication from a task requester of the one or more tasks, the actual future performance being estimated to be performed by a subset of one or more of the multiple human task performer users that is unknown at a time of the dynamic predicting, and wherein the providing of the determined predicted future performance information includes providing the determined predicted performance parameter values to the task requester that indicated the one or more tasks so that the task requester may control the actual future performance of the one or more tasks by altering at least one of the one or more attributes of the one or more tasks before the actual future performance.

24. The computing system of claim 22 wherein the task exchange server system includes software instructions for execution by the computing system.

* * * * *